INVENTOR.
STANLEY M. SHINNERS
BY
S. C. Yeaton
ATTORNEY

INVENTOR.
STANLEY M. SHINNERS
BY
S. C. Yeaton
ATTORNEY 3,246,220

SELECTIVE SIGNAL COMBINING DEVICE

Stanley M. Shinners, Plainview, N.Y., assignor to Sperry Rand Corporation, Great Neck, N.Y., a corporation of Delaware Filed July 9, 1962, Ser. No. 208,288
14 Claims. (Cl. 318—18)

This invention relates to feedback control systems of the closed loop servo type and more particularly it concerns parallel feedback type devices wherein a composite signal is synthesized from among components in different channels.

The use of automatic control systems has been extended to a very great range of applications and environments. A major limiting factor in the extended application of these systems has been the limited parameters of various elements comprising them. In order to overcome these limitations, various bypass and parallel feedback techniques have been developed wherein, for example, certain limited elements would be bypassed outside their accurate range in obtaining feedback signals; or where two or more limited range elements, each having a different accurate range of opeeration, would be operated in parallel fashion.

Both the bypass and parallel element techniques utilize multiple feedback channels, each of which carries a complete range of feedback signal components but each of which is accurate only over a different portion of that range. In the prior art, selective attenuating means have been provided to extract the accurate signal components from each of the feedback channels and signal combining means have been provided to form a single composite feedback signal which is accurate over its entire range of components.

A major difficulty encountered in the prior art involves the accurate and precise selection of the various components in each feedback channel. No attenuator is so precisely selective that certain components would be completely attenuated while adjacent components remain entirely unattenuated. Rather, most variable attenuating means produce a gradual attenuation over a finite range of values of their particular controlling characteristic.

More specifically, in the case of feedback control systems a prime criterion for defining the limitation of certain system elements is their frequency sensitivity. In order to selectively extract the accurate frequency components from the various feedback channels, frequency filter means are generally provided in each channel and are tuned to pass only a certain select band of frequency components. In this manner an entire spectrum of feedback frequency components is obtained from the most accurate band of each channel's individual spectrum. The problem occurs in the cutoff or crossover region of frequencies at which the individual filters produce something between zero and complete attenuation. Unless the filters passing adjacent frequency bands are precisely designed in accordance with each other, it is likely that certain frequency components may be passed to a great extent by both filter means whereas other frequency components in each channel may be highly attenuated by each filter means. It is nearly impossible without incurring great expense or complexity to provide filtering means which will, in this region of partial attenuation, attenuate complementary percentages of frequency components from feedback channels passing adjacent bands.

Consequently, it is an object of this invention to provide improved parallel feedback type control systems.

It is further object to provide feedback control systems wherein varying portions of signal complements from a number of different feedback channels are accurately combined.

Another object is to provide such feedback control systems with fewer, less accurate and less expensive components than as heretofore been necessary.

A still further object is to provide means for combining various complementary percentages of signal amplitudes from a plurality of sources.

These and other objects are realized in the following manner. A single attenuator responsive to a given criterion to attenuate selectively various signal components is provided. A first transmission path is provided from one of the feedback channels through the attenuator. A second transmission path is provided from the second feedback channel also through the attenuator. Finally, a third transmission path is provided from the second feedback channel, but in such a manner that it bypasses the attenuator. Means are provided to combine in substractive fashion signals of the second and third transmission paths at the output of the attenuator and means are further provided to combine in additive manner the signals of the first and third transmission paths. The resulting signal is combined degeneratively with the reference input signal to produce an error or control signal. The control system is thus provided with a composite feedback signal made up of components from each of two feedback channels with the signal components in the region of partial attenuation being processed such that complementary percentages from each channel are passed.

Referring now to the figures.

Figure 1:
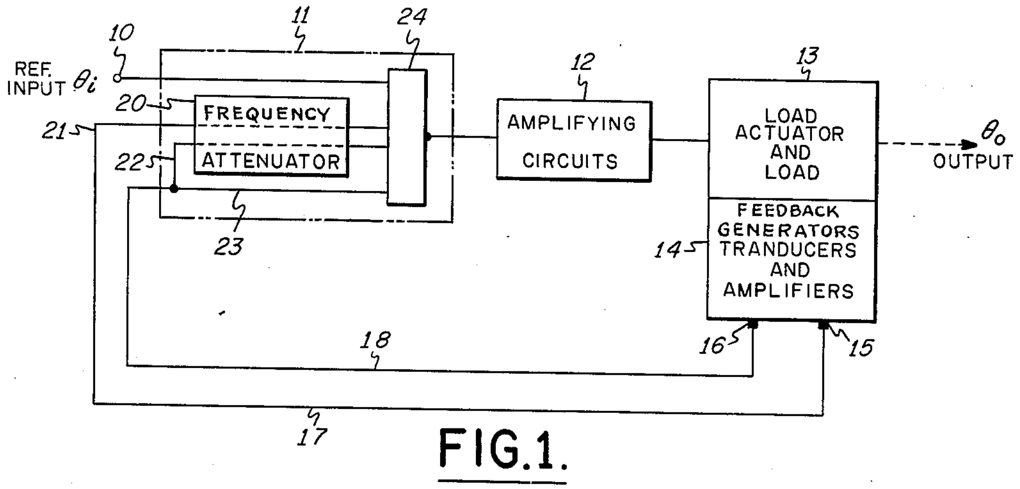
FIG. 1 is a block diagram illustrating a simplified embodiment of the invention.

The generalized embodiment shown in FIG. 1 is a closed loop system wherein an output condition, designated as $\Theta_o$, is controlled in response to a command or reference input signal $\Theta_i$ which is upplied to an input terminal 10. The input terminal is connected to a signal control unit 11 which combines the reference signal and feedback signals in a manner to produce a driving or error signal. Amplifying circuits 12 are provided to raise the amplitude of the error signal to a usable level. The error signal is then supplied to a load actuator and load 13 wherein it is converted in a manner to change the load output condition $\Theta_o$.

A multiple feedback generator 14, including signal transducers and amplifiers, is connected along the load actuator and load 13. This portion of the system produces separately derived feedback signals at each of a pair of output terminals 15 and 16. The particular manner in which the feedback signals are derived will depend upon the characteristics of the elements involved and their particular limitations. For example, it may be that certain resonance conditions occur in the actuator or load whenever the system is subjected to certain environmental influences above a critical magnitude. In this case, a first feedback transducer would be arranged to sense conditions at the extreme output of the device for environmental conditions below the critical magnitude while further feedback transducing means would be arranged to sense conditions ahead of the sensitive portion of the system for environmental conditions above the critical magnitude. Thus, two feedback channels are provided, each of which may contain a complete range of feedback signal components but each of which is accurate or usable only over a given range depending upon the magnitude of the external condition. It is to be noted that internal influences such as signal frequencies above a critical level may also produce inaccurate or otherwise undesirable results in certain forward or feedback elements. Here again parallel feedback channel techniques employing two or more elements, each accurate over a different frequency band may be employed. In this case also each channel may carry a full range of feedback frequency components but would be accurate only over a specified portion of that range. A pair of feedback channels, 17 and 18 are provided to convey the various feedback signals from the output terminals 15 and 16 to the composite signal control unit 11.

It is the purpose of the signal control unit 11 to extract the desired signal frequency components from each of the feedback channels and to combine these extracted frequency components in a degenerative manner with the reference input signal so as to produce a proper driving or error signal. An attenuator 20 is provided within the signal control unit and is adapted to act upon corresponding signal components from each of the feedback channels in an identical manner. The attenuator is controlled acording to the particular condition which affects one or more sensitive elements and which consequently limits the accuracy of the system. As the system is limited to the frequency sensitivity of one or more of its elements, the attenuator may itself be merely a frequency selective filter which would pass certain frequency components and attenuate others.

In any case the selective characteristics of a physical attenuator or its controlling means cannot be so precise that it would effect a one hundred percent attenuation where the condition controlling the attenuation is just above a critical magnitude, and zero attenuation where that condition is immediately below the critical magnitude. Rather, there will be a range of magnitudes of the controlling condition within which the attenuation will produce graduated degrees from zero to one hundred per cent attenuation. The present arrangement insures that within this range complementary percentages of the total value of corresponding signal components from each path will always be passed. This will prevent undue amplification or attenuation of the feed back signal components produced within this range of magnitudes of the controlling condition.

Three signal paths 21, 22 and 23, are provided within the signal control unit 11. The first path 21 extends from the first feedback channel 17 and through the attenuator. The second path 22 extends from the second feedback channel and also through the attenuator. The third path 23 extends from the second feedback channel but bypasses the attenuator 20. A signal combining means or mixer 24 is provided to bring together the signals in each of the three paths in such a manner that signals from the output of the second and third paths are combined in subtractive fashion while signals of the first path are combined additively with signals of the third path. The signal combining means may include phase reversing circuits and addition or signal combining circuits well known in the art. It is to be noted that in the present embodiment the reversing means have been chosen to result in a combined feedback signal which is of opposite polarity than its corresponding reference signal. As a result, the reference input signal may be additively applied to the signal combining means and thus be degeneratively controlled by the composite feedback signal. In this manner, the signal combining means performs the additional function of error detection.

The system operates in the following manner. Reference or command signals are applied at the input terminal 10 and are combined in the signal control unit 11 with the feedback signal to produce the driving error signal. This signal is amplified and supplied to the load actuator where it is utilized to change the load condition. The multiple feedback generator 14 senses the load condition in different ways to produce signals in each of the feedback channels 17 and 18. The accurate components of the signals in each of these channels are extracted and combined in the signal control unit. The particular arangement within the signal control unit ensures that for corresponding signal components present in both channels complementary percentages will be extracted from each channel.

The manner in which this is accomplished can be understood by following a signal component which happens to be in the crossover or partially attenuated region. Since the first and second signal paths convey signals from both the first and second feedback channels 17 and 18 through the same attenuator, the signal component from each channel will be equally attenuated. Thus equal percentages of this component from each feedback channel are presented at the ends of the first and second signal paths 21 and 22. Also the full value or one hundred percent of the component from the second channel 18 is present at the end of the third signal path 23. By subtracting the output of the second and third signal paths, both of which receive signals from the second feedback channel 18, a percentage of the component being considered from the second channel 18 is obtained which is equal to one hundred percent minus the percentage of it which was passed by the attenuator. It can be seen that this percentage of the component so obtained from the second channel is the complementary percentage of the component passed from the first channel since together they total one hundred percent.

It is to be noted that the signal combining means 24 may take many different forms and locations as will be shown in succeeding embodiments. The essential limitation, however, is that the signal at the end of the second and third paths be subtractively combined and that those of the first and third paths be additively combined.

Figure 2:
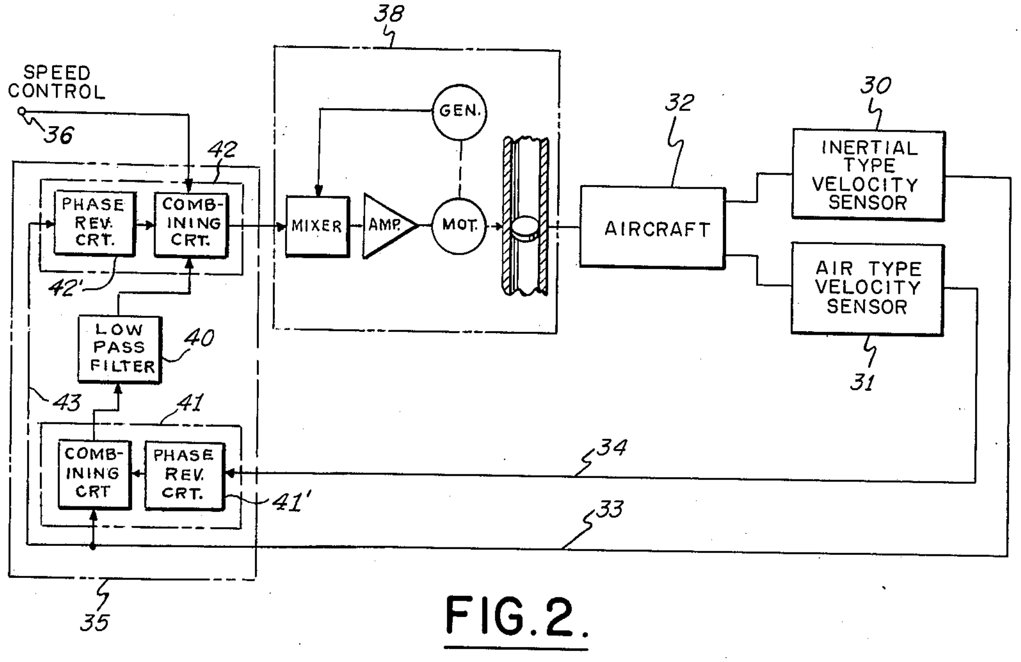
FIG. 2 is a block diagram partially in schematic showing a more specific form of the invention.

Referring now to FIG. 2, an application of the principles of the present invention to an automatic aircraft velocity control system can be seen. The system shown is similar to that described in Patent No. 2,948,496, issued on Aug. 9, 1960, in the name of Everett S. Joline, and assigned to the assignee of the present invention. In that case, as in FIG. 2, parallel feedback paths are provided to overcome the limitations of certain velocity sensing devices. As can be seen in FIG. 2, both inertial and air pressure type velocity sensing means 30 and 31 are provided to indicate the forward velocity of an aircraft 32. The output signals from these velocity sensing elements are supplied via corresponding parallel feedback channels 33 and 34 to a signal control unit 35 in a manner similar to that of FIG. 1. A reference or speed control signal is also supplied via an input terminal 36 to the composite signal combining means. The accurate signal frequency components from each feedback channel are degeneratively combined with the reference signal in the signal control unit 35 to produce an error signal which is supplied to an engine control subsystem 38, which in turn, increases or decreases the aircraft forward velocity.

The signal control unit 35 operates in a manner similar to its counterpart in FIG. 1. In the present case, the factor which affects proper and accurate operation of feedback transducers 30 and 31 is their frequency sensitivity. In the case of relatively sudden changes in aircraft velocity (represented by higher frequencies), the inertia type sensor provides a more accurate indication, whereas in the case of relatively slow changes in aircraft velocity, (represented by lower frequencies) the air pressure type sensor will provide more accurate information. It is the purpose of the signal control unit 35 then, to extract the higher frequency components of the signal in the inertial sensor feedback channel 33 and to extract the lower frequency signal components from the air pressure sensor feedback channel 34.

Since the selective extraction is to be based upon the frequency of the various components, the attenuator in the signal control unit of the present embodiment takes the form of a low frequency band pass filter 40 which passes signal components below a selected frequency and attenuates components above that frequency. Also, in the present embodiment, a pair of signal subtractive combining means 41 and 42 with respective combining circuits are provided on either side of the low pass filter 40. The first signal combining means 41 has an input connected to the air pressure sensor feedback channel 34 and has an input connected to the inertial sensor feedback channel 33. Output signals from this first combining means 41 are applied to the low pass filter 40, which in turn is connected to an input terminal of the second signal combining means 42. The inertial feedback channel 33 is also connected via a bypass line 43 to provide an input to the second combining means 42.

As in FIG. 1, the composite signal combining means of the present arrangement also contains three signal paths. The first path extends from the air sensor feedback channel 34 via the first signal combining means 41 and through the low pass filter 40. The second signal path extends from the inertial feedback channel 33 via the first signal combining means 41 and also through the low pass filter 40. And the third signal path extends from the inertial channel 33 and through the bypass line 43 around the filter 40. The specific arrangement within the signal control unit of the present embodiment is somewhat different than that of FIG. 1. In the present case the signals of the first and third signal paths are additively combined by causing the signals of the first path to be reversed in phase in a phase reversing circuit 41' in the first combining means 41, and the signals of the third path to be reversed in phase in a phase reversing circuit 42' in the second signal combining means 42, thus permitting the signals to be combined in the same phase relation. It should also be noted that the signals of the first and second paths are combined in the present embodiment prior to the filter. Since both paths traverse the same filter, this expedient furnishes a convenient means for simultaneously handling the signals of both paths. Also it provides a means for additively combining the signals of the first and third paths.

During operation of the system changes in aircraft velocity are detected by both the air pressure and the inertial velocity sensing devices 30 and 31 whose outputs are fed back along the corresponding feedback channels 33 and 34 to the signal control unit 35. The high frequency components from the air sensor feedback channel 34 are attenuated by the low pass filter 40 while the low frequency components from that channel pass unattenuated through the filter. At the same time low frequency signal components from the inertial sensor feedback channel 33 pass through the filter 40 but become cancelled in the combining means 42 when combined with their unattenuated counterparts from the bypass line 43. High frequency signals from this channel however while being attenuated by the low pass filter 40 will be permitted to pass through the unit via the bypass line 43. Thus, it can be seen that the signal control unit passes only low frequency signal components from the air pressure sensor feedback channel and only high frequency signal components from the inertial sensor feedback channel. In the region of frequencies for which the filter 40 provides partial attenuation, complementary percentages of like frequency components in each channel will be passed as described in connection with the embodiment of FIG. 1. In the described servo system, the second and third path feedback signals are subtractively combined. The feedback provided by the second and third signal paths is accordingly degenerative in character while the feedback provided by the first and third signal paths is regenerative in character.

Figure 3:
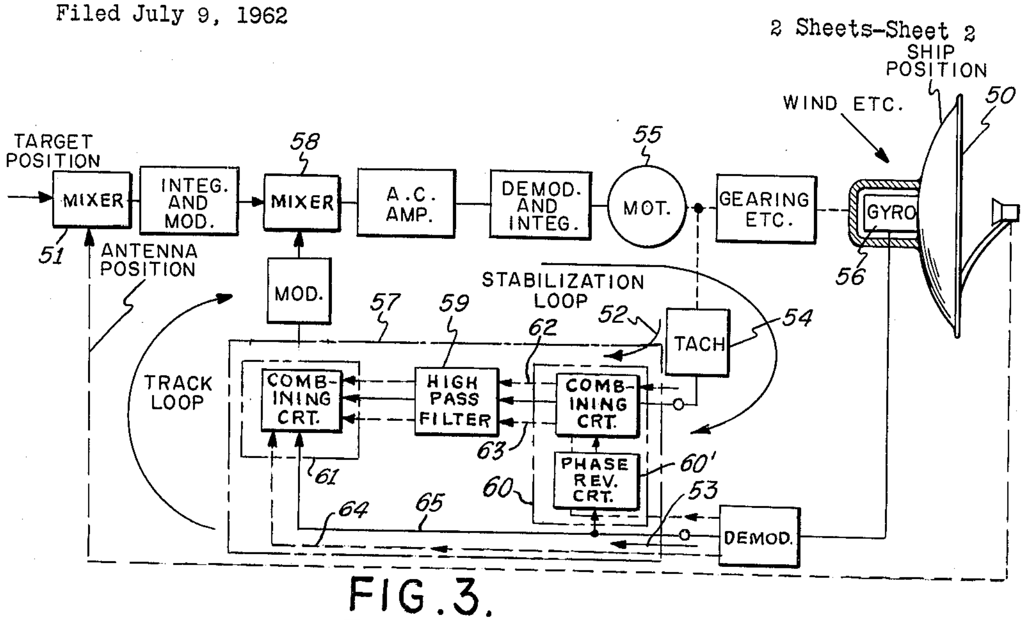
FIG. 3 is a further block diagram partially in schematic illustrating a second specific embodiment of the invention.

A still further embodiment of the invention is shown schematically in FIG. 3. In this embodiment the line of sight of a shipboard tracking radar antenna 50 is controlled in response to signals generated in a microwave comparator and radar receiver unit 51. A combined rate damping and ship movement compensation is achieved by means of a pair of rate feedback channels 52 and 53. The first channel 52 obtains feedback signals from a tachometer 54 mounted on a drive motor 55 which moves the antenna 50. The second channel 53 obtains feedback signal from a rate gyro 56 mounted directly on the antenna 50. A signal control unit 57 selects accurate frequency components from each of the feedback channels and applies them degeneratively to an error detector 58. The particular manner in which improved performance is achieved through bypassing mechanically resonant loads such as this antenna system is described in a copending application assigned to the assignee of the present application.

The signal control unit of the present embodiment is similar to that of FIG. 2 in that it consists of a frequency filter 59 on either side of which are signal combining means 60 and 61. In the present case, however, the frequency filter happens to be of the high bandpass type. Also, in the present case the first signal combining means 60 is a combining circuit and a phase reversing circuit 60' while the second signal combining means 61 is a combining circuit. As in the preceding cases, the present embodiment also includes three signal paths 62, 63 and 64. The first path 62 extends from the first feedback channel 52 through the input to the signal additive combining means 60 and through the high pass filter 59 to the input of the signal combining means 61. The second signal path 63 extends from the second feedback channel 56 through the subtractive input to the combining means 60 and through the high pass filter 59 to the signal additive combining means 61. The third signal path 64 also commences at the second feedback channel 53, but is applied directly to the signal combining means 61 via a bypass line 65.

During operation of the system, the high frequency components of signals from the first feedback channel 54 pass uninhibited through the first signal path 62 while the low frequency components are completely attenuated in the highpass filter 59. Meanwhile, high frequency signal components from the second feedback channel 56, traverse both the second and third signal paths 63 and 64. However, since these components in passing through the second signal path 63 are reversed in phase in the phase reversing circuit 60' of the combining means 60, they are cancelled in the combining means 61, when combined with their counterparts from the third signal path 64. On the other hand, the low frequency signal components from the second feedback channel will not be so cancelled since the counterparts in the second signal path are completely attenuated in the high pass filter. Thus, in the present case as in the preceding embodiments, a single composite feedback signal is obtained by combining the high frequency components from the first feedback channel and the low frequency components from the second feedback channel.

An important advantage of the present invention lies in the fact that for those frequency components which are partially attenuated in the filter 59, a total output amplitude is produced which always falls within the range of amplitudes of that component in the individual feedback channels. Also a smooth transition is insured from one feedback channel to the other for signals of varying frequency independently of the particular characteristics of the particular filter being used. This prevents undue amplification of certain frequency components which may well cause uncontrolled oscillation of the system, and at the same time permits a complete spectrum of frequency components to be utilized in the feedback.

Figure 4:
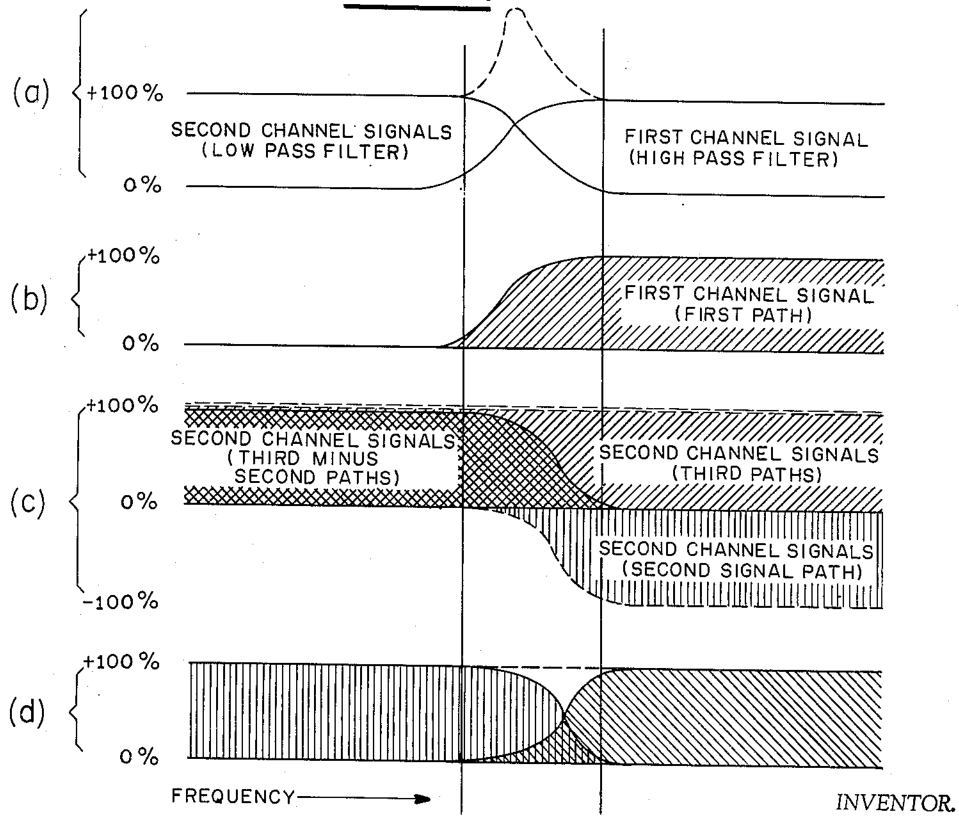
FIG. 4 is a diagram showing the characteristics of the signal control means represented in FIG. 3.

The significance of this can be seen in the diagrams of FIG. 4, which illustrate various aspects of the operation of the embodiment shown in FIG. 3. The effects of one common prior art technique for extracting the desired frequency components from the two feedback channels of that embodiment is shown in the upper diagram *a* of FIG. 4. Diagram *a* is a plot of frequency versus percentage transmission for high and low pass filters used in typical prior art devices. In the prior art the high frequency signal components from one channel and the low frequency signal components from the other channel are generally extracted from the signals in those channels by means of high pass and low pass filters in each respective channel. As a practical matter, however, it is extremely difficult, if not impossible, to design frequency filters having characteristics such that complementary percentages of corresponding frequency components in each channel are produced in the partial attenuation or crossover region of the filters. Thus, as is seen in the uppermost diagram of FIG. 4, in this crossover region a very erratic total signal amplitude results since the characteristics of the respective filter circuits are not properly matched.

The remaining diagrams of FIG. 4 show the development of the feedback signal according to the principles of the present invention. The second diagram *b* shows signal components passed via the first signal path through the high pass filter. The third diagram *c* shows in dotted lines the signal components from the second feedback channel 53 passed via the second and third signal paths 63 and 64 respectively. The solid line of diagram *c* shows the results of combining the passed signals from the second and third signal paths. This amounts to an overall frequency versus percentage transmission characteristic for the unit as concerns signal frequency components from the second feedback channel. It is to be noted that this characteristic is the precise conjugate of that for signals from the first feedback channel. Thus, when these two characteristics are combined as in the lowermost diagram *d*, an over-all signal transfer characteristic is achieved which is perfectly smooth even in the crossover frequency range of the filter, independently of the particular variation of filter characteristics in the cross-over region. As a result a composite feedback signal may be produced without erratic amplification or attenuation of certain frequency components. Also, these results are achieved with fewer components and less rigid design tolerances than heretofore has been necessary.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A variable frequency feedback control system comprising a series of control system elements in closed loop arrangement, a portion of said closed loop arrangement including parallel signal channels, a signal control means within said arrangement at the end of said portion for selectively combining signals from each of said parallel signal channels of different frequencies, said signal control means including frequency selective attenuator, means for transmitting signal components of different frequency along a first signal path extending from one of said parallel signal channels, means for transmitting signal components of different frequencies along second and third signal paths extending from the other of said parallel signal channels, said first and second signal paths traversing said frequency selective attenuator, said third signal path bypassing said frequency selective attenuator, means for combining signals to the attenuator of said first and second signal paths, and means for combining the attenuated signals of said first and second signal paths with the unattenuated signals of the third path.

2. A variable frequency feedback control system comprising a forward series of control system elements operative to change an output condition in response to applied command signals, first and second transducer means for producing feedback signals in response to conditions along said forward series of elements, a feedback signal control means including a signal attenuator, means for transmitting signal components along a first signal path extending from said first transducer, means for transmitting signal components along second and third signal paths extending from said second transducer, said first and second signal paths traversing said attenuator, said third signal path bypassing said attenuator, means for regeneratively combining said command signals with signal components from said first and third signal paths and for degeneratively combining command signals with signal components from said second and third signal paths.

3. A variable frequency feedback control system comprising a forward series of control system elements operative to change an output condition in response to applied command signals, first and second transducer means for producing feedback signals in response to conditions along said forward series of elements, the signals from said first transducer having a first range of accurate frequency components, the signals from said second transducer having a second range of accurate frequency components, a feedback signal control means including a frequency filter capable of passing signal frequency components within said first range and of attenuating signal frequency components outside said first range, means for transmitting feedback signals along a first signal path extending from said first transducer, means for transmitting feedback signals along second and third signal paths extending from said second transducer, said first and second signal paths passing through said frequency filter, said third signal path bypassing said frequency filter, means for regeneratively combining said command signals with signal components from said first and second signal paths and for degeneratively combining said command signals with signal components from said second and third signal paths.

4. A variable frequency feedback control system comprising a forward series of control system elements operative to change an output condition in response to applied command signals, first and second transducer means for producing feedback signals in response to conditions along said forward series of elements, a feedback signal control means including a signal attenuator, a first signal combining means for receiving feedback signals from each of said transducers and applying said signals to said attenuator, a second signal combining means for receiving feedback signals from said attenuator and one of said two transducers, said signal combining means and attenuator being arranged so that feedback signals from said one transducer received at said second signal combining means be subtractively combined with the signals from said one transducer that pass through said attenuator and be additively combined with signals from the other transducer that pass through said attenuator, and means for degeneratively combining said applied command signals with the signals from said second combining means.

5. A variable frequency feedback control system comprising a series of components in closed loop arrangement, a portion of said loop comprising parallel signal paths, a signal control means at the end of said portion for selectively combining various signal components from each of said paths, said signal control means including an attenuator, an additive and a subtractive signal combining circuit in the loop, the signal subtractive circuit combining signals from each of said paths to provide an input to the attenuator, the additive circuit combining signals from one of said paths with output of the attenuator.

6. A variable frequency control system for producing desired outputs in response to applied command signals, said system comprising, a forward series of components operative to change said outputs in response to said command signals, first and second transducer means for producing feedback signals upon corresponding terminals in response to conditions along said forward series, signal control means including an attenuator, an additive and a subtractive signal circuit, the subtractive signal from each of said corresponding terminals to provide an input to the attenutaor, the additive signal circuit combining signals from one of said corresponding terminals with the output of the attenuator, and means for combining the output of the additive combining circuit and the command signals.

7. In a variable frequency control system for producing desired physical outputs in response to applied command signals, a feedback arrangement comprising a pair of transducers each being accurately responsive to changes of said physical outputs occurring within different frequency ranges, a first signal combining means for the output signals of the one transducer and the output signals of the other transducer, a frequency filter for attenuating signal components within one of said frequency ranges and of passing signal components within the other connected to receive the output signals of said first signal combining means, a second signal combining means arranged to receive signals from one of said transducers and the output of said frequency filter, and means for degeneratively combining the command signals and the output of the second signal combining means.

8. A variable frequency system for accurately controlling aircraft velocity, said system comprising an engine power control unit having a reference input signal an inertial and an air pressure type velocity sensor, each velocity sensor being mounted to sense aircraft velocity and to produce corresponding feedback signals, a first signal combining means with a circuit for subtracting air pressure sensor feedback signals from inertial sensor feedback signals, a frequency filter passing all inaccurate feedback signal frequency components from said air pressure sensor and attenuating all other frequency components, a second signal combining means with a circuit for subtracting inertial sensor feedback signals from output signals received from said frequency filter, and means for combining the output of said second combining means the reference input signal to operate with said engine power control unit.

9. A variable frequency control system for producing desired physical outputs in response to applied command signals, said system comprising an error signal detector, amplifying means and output actuating means responsive to signals from said error signal detector to change said physical outputs, a first transducer for generating signals representative of actual output conditions, a second transducer for generating signals representative of conditions at a point between said error signal detector and the output of said system, the portion of the system between said first and second transducers being characterized by signal transfer characteristics which deleteriously affect system operation within a known frequency range, a feedback signal control means including an attenuator, a first signal combining means for subtracting the signals of said second transducer from the signals of the first transducer connected to said variable attenuator, and a second signal combining means for adding the signals from said attenuator and the unattenuated signals of said second transducer operatively connected to the error signal detector.

10. A variable frequency control system for producing desired physical outputs in response to applied command signals, said system comprising an error signal detector, amplifying means and output actuating means responsive to signals from said error signal detector, a first transducer for generating signals representative of actual output conditions, a second transducer for generating signals representative of conditions at a point between said error signal detector and the output of said system, the portion of said system between said first and second transducers being characterized by signal transfer characteristics which deleteriously affect system operation within a known frequency range, a feedback signal control means including a frequency filter adapted to pass frequency components within said known range and to attenuate all other frequency components, a first signal combining means for subtracting signals produced by said first transducer from signals produced by said second transducer connected to said frequency filter, and a second signal combining means operatively connected to the detector for adding the output of the filter and the unattenuated signals of the second transducer.

11. A variable frequency system for accurately controlling the line of sight of a vehicle mounted tracking radar antenna, said system comprising a target tracking loop including radar transmitting and receiving means for generating command signals representative of target angular displacement with respect to said antenna line of sight, antenna drive means operative through coupling means to change said antenna line of sight in response to said command signals, a rate feedback damping means including an inertial type sensing means mounted on said antenna in a position to produce a first group of rate feedback signals representative of rates of change of said antenna line of sight in space, a tachometer sensing means mounted at the output of said antenna drive means to produce a second group of rate feedback signals representative of rate of change of said antenna drive means with respect to said system, the portion of said system which includes said antenna and said coupling means being characterized by signal transfer characteristics which unduly amplify and shift the phase of signal frequency components above a known value, a signal subtracting means arranged to subtract the output signals of one of said sensing means from the output signals of the other sensing means, a frequency filter capable of passing a first band and of attenuating a second band of signal frequency components, said bands extending in the vicinity of said known frequency, said second band including only accurate components produced by said one sensing means, said first band including only accurate components produced by said other sensing means, a signal combining means for additively combining signals directly from said one sensing means and from said frequency filter, and means for degeneratively combining said command signals with the output of said signal combining means.

12. In a closed loop servo system of the variable frequency range responsive type, variable frequency signal means for providing a reference output, first feedback singal means by providing a variable frequency output to the loop for one of the frequency ranges, second feedback signal means for providing a variable frequency output to the loop for the other of the frequency ranges, a circuit for combining the feedback signals means including an electrical filter for attenuating the output of the first feedback means in the other frequency range and for attenuating the output of the second feedback means in the other of the frequency ranges, first means for combining the outputs of the first and second feedback means providing an input to the filter, second means for combining the output of the filter and the output of said second feedback signal means, and servo means responsive to the outputs of said reference signal means and said second combining means.

13. A system of the character claimed in claim 12, in which the filter of the system is a low pass filter, the first combining means includes a phase reversing circuit for the output of the first feedback means and the second combining means includes a phase reversing circuit for the output of the second feedback means.

14. A system of the character claimed in claim 12, in which the filter of the system is a high pass filter, and the first combining means includes a phase reversing circuit for the output of the first feedback means.

No references cited.

JOHN F. COUCH, *Primary Examiner.*

MILTON BUCHLER, *Examiner.*

R. D. BLAKESLEE, *Assistant Examiner.*